UNITED STATES PATENT OFFICE.

FREDERICK FRANK PRUSZ, OF CENTRALIA, ILLINOIS.

CLEANSING COMPOUND.

No. 879,902.　　　Specification of Letters Patent.　　　Patented Feb. 25, 1908.

Application filed November 2, 1907. Serial No. 400,339.

*To all whom it may concern:*

Be it known that I, FREDERICK FRANK PRUSZ, a citizen of the United States, residing at Centralia, in the county of Marion and State of Illinois, have invented certain new and useful Improvements in Cleansing Compounds, of which the following is a specification.

This invention relates to an improved cleansing compound, adapted to be used for sanitary sweeping purposes, for the purpose of cleansing floors and furniture, it being understood that said compound may be usefully employed for the purpose of cleansing uncovered floors, as well as rugs, carpets, linoleums and other floor coverings, for cleansing and brightening upholstered furniture, and for other similar uses.

The invention has for its object to provide a simple, inexpensive and convenient compound which may be readily sprinkled upon the floors or articles that are to be cleansed, previous to sweeping, the purpose of the said compound being to keep down dust while the sweeping is in progress; to catch and absorb the dust; to kill disease germs; to disinfect premises; to drive away and destroy insects and vermin, especially such as frequently infest houses and residences, such as moths, bugs, roaches, and the like; and to promote cleanliness and sanitary conditions.

With these and other ends in view which will readily appear as the nature of the invention is better understood, the same consists in the improved composition of matter to be hereinafter fully described and particularly set forth in the claims.

The improved compound is composed of the following ingredients in about the proportions set forth, to wit:

Rip-sawed sawdust ----- 1 pound.
Fine sand ------------- 1 pound.
Common salt ----------- ¼ pound.
Wheat bran ------------ ¼ pound.
Floor oil ------------- ¾ pound.
Borax ----------------- ½ ounce.
Turpentine ------------ 1 ounce.
Carbolic acid --------- ½ dram.
Coloring matter to suit.

The several ingredients are to be thoroughly mingled by agitation, the liquids being readily absorbed by the sawdust and bran, both of which ingredients are of a porous nature.

The special uses of the several ingredients are as follows: Rip-sawed sawdust, consists of relatively smooth, round grains which, instead of adhering, will roll, and will not stick to floors, floor coverings, brooms or brushes while in use; it absorbs and retains the oily substances. Fine sand is used as a separator. Common salt possesses superior cleansing qualities, and it is useful for brightening the colors and restoring life to carpets, rugs, furniture covers and the like. It is a superior disinfectant; tends to prevent combustion; will not breed germs; and is superior as a mixer with the other component parts of this compound. It is extremely useful for absorbing and removing dust and dirt, and tends to prevent dust from rising while sweeping is in progress. Wheat bran, on account of its superior adhesive qualities, is extremely useful for picking up particles of dust and germs; being highly porous, it acts like a sponge for absorbing oil, dirt and dust; it makes the entire compound flossy, absorbent and agglomerative, thus improving its cleansing qualities. Floor oil collects and keeps down the dust and dirt, and serves for polishing uncovered floors and linoleums, while the fibers of carpets and furniture coverings are renewed and strengthened thereby; any suitable non-volatile oil may be used. Borax, as is well known, prevents and destroys bugs, especially roaches, and it possesses superior cleansing qualities. Turpentine is particularly useful for preventing and exterminating moths; it is an excellent cleanser, and is useful for brightening and polishing floors and linoleums. Carbolic acid is used in connection with the other ingredients as a disinfectant. Coloring material, such as yellow ocher, venetian red, or paris green, may be used in quantities to suit, according to the taste of the user, and to the colors of the floors or materials that are to be operated upon.

The improved compound is to be sprinkled over the floors or surfaces that are to be cleansed, previous to sweeping; sweeping with an ordinary brush or broom will cause the compound to be carried and rubbed over the surface in such a manner as to absorb the dust and dirt, to prevent the dust from rising; and to restore polish and bright colors. Germs will be destroyed, and sanitation and cleanliness promoted by the liberal use of the compound.

Having thus described the invention, what is claimed is:

1. A cleansing compound composed of rip-sawed sawdust, fine sand, common salt, wheat bran, floor oil, borax, turpentine and carbolic acid, substantially as described and for the purpose set forth.

2. The herein described composition of matter for cleansing purposes, consisting of rip-sawed sawdust, 1 pound; fine sand, 1 pound; common salt, 1/4 pound; wheat bran, 1/4 pound; floor oil, 3/4 pound, borax, 1/2 ounce; turpentine, 1 ounce, carbolic acid, 1/2 dram, and coloring matter to suit, substantially as and for the purpose set forth.

In testimony whereof I affix my signature in presence of two witnesses.

FREDERICK FRANK PRUSZ.

Witnesses:
    J. HENRY DOELLING,
    WM. G. MURPHEY.